United States Patent [19]
Field

[11] Patent Number: 5,502,978
[45] Date of Patent: Apr. 2, 1996

[54] WATER COOLING APPARATUS

[75] Inventor: George R. Field, Edmonton, Canada

[73] Assignee: Big Iron Drilling Ltd., Edmonton, Canada

[21] Appl. No.: 339,173

[22] Filed: Nov. 10, 1994

[51] Int. Cl.[6] ................................................. G05D 23/32
[52] U.S. Cl. ...................... 62/157; 62/231; 62/389; 62/440; 222/146.6
[58] Field of Search ............................ 62/157, 231, 338, 62/339, 440, 389; 210/196, 251, 739, 138, 139, 257.1, 194, 195.1, 259, 266, 282, 287; 222/146.6

[56] References Cited

U.S. PATENT DOCUMENTS 3,118,289  1/1964  Schultz.
4,957,624  9/1990  Peranio ................................. 210/196
5,083,442  1/1992  Vlock ..................................... 62/338

*Primary Examiner*—John M. Sollecito
*Attorney, Agent, or Firm*—George A. Seaby

[57] ABSTRACT

In general, clean cold water can be made available in a household by means of either an expensive refrigerator with a cold water dispenser or a separate cooler and bulky, replaceable water bottles. A simple solution to the problem involves a carbon filter and cooling reservoir combination for mounting in a refrigerator, a pipe system containing a faucet for dispensing cold water and returning water to the filter, and a pump/timer combination for periodically recycling the water in the pipe system through the filter, whereby cold water is always virtually instantaneously available at the faucet.

6 Claims, 1 Drawing Sheet

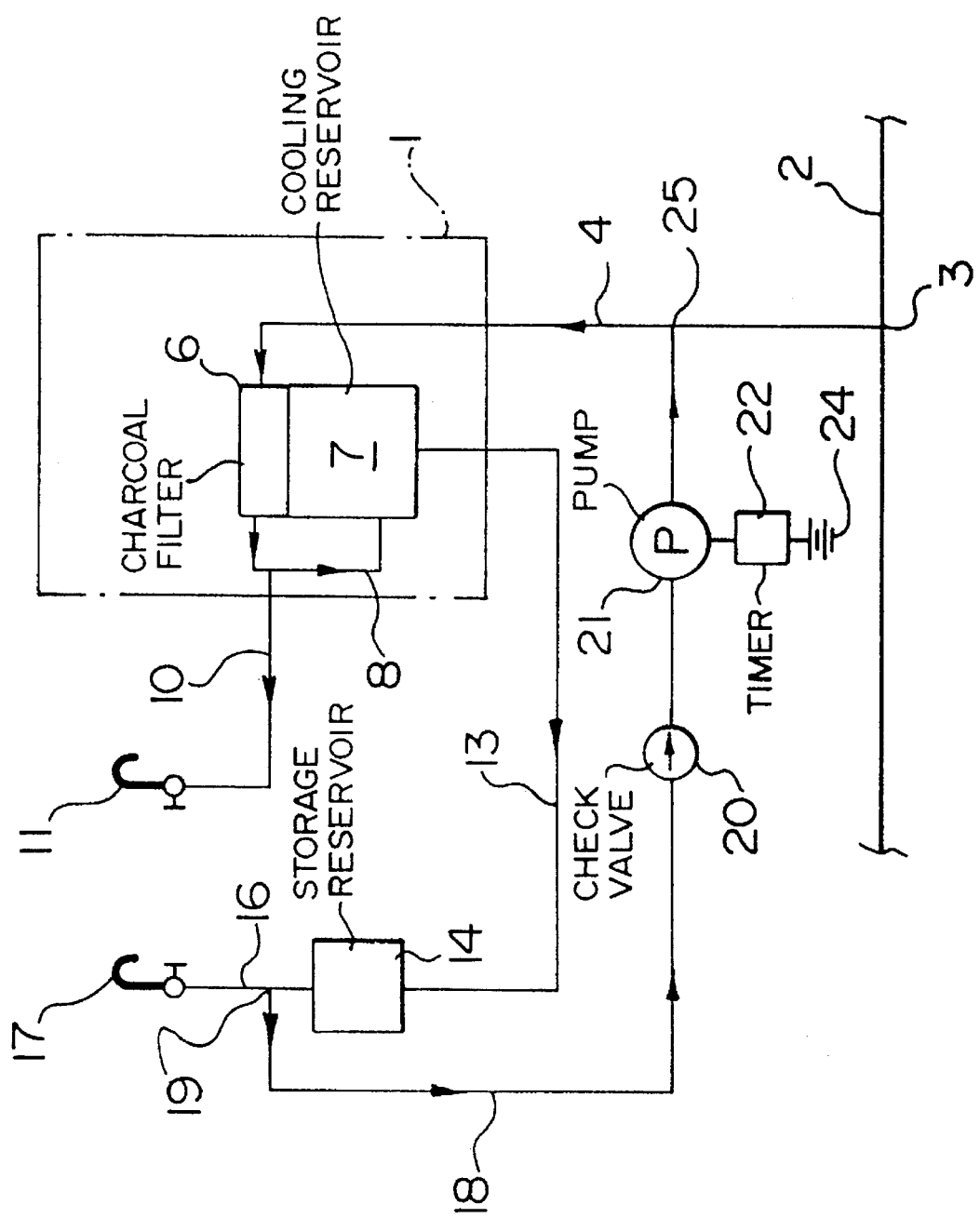

WATER COOLING APPARATUS

BACKGROUND OF THE INVENTION

1. Field of the Invention

This invention relates to a water cooling apparatus for use in a refrigerator.

More specifically, the invention relates to a water cooling apparatus for use in conventional domestic refrigerators for dispensing cold water substantially instantaneously.

2. Discussion of the Prior Art

Currently, there are two methods of direct dispensing of clean, cold water in a home. One method involves the use of bottled water and a cooler, which is often rented to the consumer. Of course, the bottles must be replaced from time to time with new bottles containing water. Not only is the rental of the coolers expensive, but the jugs of water are expensive, heavy and difficult to handle. A second method involves the use of built-in water dispensers in modern refrigerators. Refrigerators incorporating cold water dispensers are relatively expensive, and the dispensing of water at the refrigerator can be a messy operation. Moreover, for the owner of the more conventional refrigerator, the problem still exists. It would be extremely expensive to retrofit existing refrigerators to incorporate water coolers therein. In fact, to the best of the present inventor's knowledge, such a procedure is not practiced.

Another problem encountered with household water supplies is that of clean drinking water. The use of carbon and other filters has proliferated. However, carbon filters have a serious drawback. At room and higher temperatures, the charcoal used in such filters is a good breeding ground for bacteria. The problem is so serious that some jurisdictions have considered banning the use of carbon filters in household water systems.

U.S. Pat. Nos. 3,118,289, which issued to R. Schultz on Jan. 21, 1964 and 5,083,442, which issued to M. Vlock on Jan. 28, 1992 provide solutions to one or the other of the problems mentioned above. However, the Schultz patent does not address the problem of clean water, and the Vlock refrigerator would be expensive to produce. In order to obtain cold water using the Schultz apparatus, it would be necessary to flush all of the warm water out of any pipes or tubes downstream of the water tank in the refrigerator. Adapting the Vlock cooling system to existing conventional refrigerators would be so expensive that it would be out of the question.

GENERAL DESCRIPTION OF THE INVENTION

An object of the present invention is to provide a solution to the above described problems in the form of a relatively simple apparatus for providing clean cold water virtually on demand.

Another object of the invention is to provide an apparatus for providing cold drinking water which can readily be retrofitted to existing refrigerators.

Yet another object of the invention is the provision of a water cooling and filtering apparatus, in which the filter does not present a health hazard.

Accordingly, the present invention relates to a water cooling apparatus for use with a refrigerator comprising inlet means for introducing water from a source thereof into a refrigerator for cooling; carbon filter means for mounting in a refrigerator for receiving water from said inlet means for cleaning; cooling reservoir means for mounting in the refrigerator to receive the water from the filter means; outlet means for dispensing cold water from said cooling reservoir to a dispenser external to the refrigerator; bypass means connected to said outlet means for returning water from said outlet means to said filter means; and recirculating means in said bypass means for recirculating cold water from said outlet means, whereby cold water is constantly present in said outlet means.

BRIEF DESCRIPTION OF THE DRAWINGS

The invention will be described in greater detail with reference to the accompanying drawing, which illustrates a preferred embodiment of the invention, and wherein the single FIGURE is a schematic block diagram of a water cooling apparatus in accordance with the invention.

DESCRIPTION OF THE PREFERRED EMBODIMENT

The present invention is based on the realization that when cooled the charcoal used in a carbon filter combined with moving water does not constitute a breeding ground for bacteria. By incorporating such a filter in a system including circulating cold water, the problem of bacterial contamination of the filter is solved. Moreover, in accordance with one aspect of the invention, the filter can still be used to provide filtered, uncooled water to a conventional faucet external to the refrigerator.

With reference to the drawing, the water cooling apparatus of the present invention is intended for use with a refrigerator 1. Water from the source thereof, e.g. a well or municipal water supply, enters a dwelling via a main pipe 2, and is introduced into the apparatus via a T-joint 3 in the pipe 2 and a pipe 4. The water flows through the pipe 4 into the refrigerator 1. The pipe 4 is connected to a charcoal filter 6, which is connected to a cooling reservoir 7 by a pipe 8.

Water from the line 8 can be fed via pipe 10 directly to a faucet 11, providing a source of room temperature filtered water. In order to dispense cooled, filtered water, the water in the cooler is fed from the cooler through a pipe 13 to a storage tank or reservoir 14, which is mounted in a cupboard (not shown), beneath a kitchen counter or at another convenient location proximate a kitchen sink. The cold water is dispensed from the reservoir 14 through a pipe 16 and a separate faucet 17.

In order to ensure that water in the pipe 13 and the reservoir 14 is always cold, the water is periodically or continuously recycled through the cooling reservoir 7 in the refrigerator 1. For such purpose a return pipe 18 is connected to the pipe 16 by a T-joint 19. The return pipe 18 contains a one-way or check valve 20 and a pump 21. The valve 20 ensures that water from the well or municipal water supply does not directly enter the reservoir 14 without passing through the filter 6 and the cooling reservoir 7. The pump 21 is connected to a timer 22, which is connected to a source 24 of electrical power. In the case of continuous circulation, the timer 22 is omitted. The outlet end of the pipe 18 downstream of the pump 21 in the direction of water flow is connected to the pipe 4 by a T-joint 25.

It will be appreciated that the cooling reservoir 7 can be a coil or a serpentine length of pipe designed to ensure efficient heat exchange in the refrigerator 1. The pipes to and from the refrigerator can be inexpensive plastic or a suitable metal such as stainless steel. Moreover, all of the pipes carrying cold water and the storage reservoir can be suitably insulated.

In operation, water entering the apparatus via the pipe 4 enters the filter 6. The water can then be dispensed directly through the pipes 8 and 10, and faucet 11 to the consumer. Alternatively, the water passes through the pipe 8 into the cooling reservoir 7 where the water remains for a sufficient period of time for proper cooling. The water is fed from the cooling reservoir 7 via pipe 13 to the storage reservoir 14 either when the tap on the faucet 17 is opened or when the pump 21 is operating. When the tap on the faucet 17 is opened, the pressure in the pipes causes water to flow from the cooling reservoir 7 to the storage reservoir 14. The pump 21 is operated periodically or continuously to recycle water from the storage reservoir 14 to the cooling reservoir 7 and vice versa. It will be appreciated that during recycling operations, already filtered water is again filtered by passing through the filter 6 which, at worst, has a positive effect on water quality. The period of time between recycling operations can be changed by adjusting the timer 22. Of course, pump operation should be directly related to consumption. For example, if the system is being used infrequently, recycling should be effected frequently to ensure that the filter 6 is being flushed out. Thus, cold, clean water is virtually always instantaneously available at the faucet 17, because the whole system (with the exception of the inlet pipe 4) contains cold water, i.e. it is not necessary to flush warm water out of the portion of the pipe 13 extending between the refrigerator 1 and the faucet 17.

I claim:

1. A water cooling apparatus for use with a refrigerator comprising inlet means for introducing water from a source thereof into a refrigerator for cooling; carbon filter means for mounting in a refrigerator for receiving water from said inlet means for cleaning; cooling reservoir means for mounting in the refrigerator to receive the water from the filter means; outlet means for dispensing cold water from said cooling reservoir means to a dispenser external to the refrigerator; bypass means connected to said outlet means for returning water from said outlet means to said filter means; and recirculating means including pump means in said bypass means for recirculating cold water from said outlet means to said filter means, whereby clean, cold water is constantly present in said outlet means, and timer means connected to said pump means for operating said pump means on a periodic basis.

2. A water cooling apparatus according to claim 1, wherein said recirculating means includes check valve means in said bypass means for preventing the entry of unfiltered water into said outlet means.

3. A water cooling apparatus according to claim 2 wherein said outlet means includes outlet pipe means for carrying cold water from said cooling reservoir means; and storage reservoir means for use outside of the refrigerator for temporarily storing cold water.

4. A water cooling apparatus for use with a refrigerator including carbon filter means for mounting in a refrigerator; inlet pipe means for introducing water from a source thereof into the filter means; cooling reservoir means for mounting in the refrigerator for receiving the water from the filter means for cooling; first outlet pipe means for dispensing cold water from said cooling reservoir to a dispenser external to the refrigerator; first bypass pipe means connected to said first outlet pipe means for returning cooled water from said first outlet pipe means to said inlet pipe means for recirculation through said filter means; pump means in said first bypass pipe means for recirculating the water from the first outlet pipe means to said filter means to draw fresh cooled water into said first outlet pipe means, whereby cool water is constantly present in said first outlet pipe means; and timer means connected to said pump means for operating said pump means on a periodic basis, whereby cool water is present in said first outlet pipe means on a more or less continuous basis.

5. A water cooling apparatus according to claim 4, including second bypass pipe means for feeding water from said filter means to said cooling reservoir means in the refrigerator; and second outlet pipe means connected to said second bypass pipe means for dispensing filtered water from said filter means.

6. A water cooling apparatus according to claim 5, including storage reservoir means in said first outlet pipe means upstream of said first bypass pipe means in the direction of water flow for storing cooled water prior to dispensing.

* * * * *